US012640393B2

(12) United States Patent (10) Patent No.: US 12,640,393 B2
Takeuchi et al. (45) Date of Patent: May 26, 2026

(54) SOLID ELECTROLYTE MATERIAL AND BATTERY USING SAME

(71) Applicant: Panasonic Intellectual Property Management Co., Ltd., Osaka (JP)

(72) Inventors: Kaori Takeuchi, Osaka (JP); Yoshiaki Tanaka, Kyoto (JP); Tetsuya Asano, Nara (JP); Akihiro Sakai, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 759 days.

(21) Appl. No.: 17/974,355

(22) Filed: Oct. 26, 2022

(65) Prior Publication Data

US 2023/0055771 A1 Feb. 23, 2023

Related U.S. Application Data

(63) Continuation of application No. PCT/JP2021/004837, filed on Feb. 9, 2021.

(30) Foreign Application Priority Data

Apr. 30, 2020 (JP) ................................. 2020-080655

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/008* (2013.01)

(58) Field of Classification Search
CPC ...................... H01M 10/0525; H01M 10/0562
See application file for complete search history.

(56) References Cited

U.S. PATENT DOCUMENTS

| | | | |
|---|---|---|---|
| 2012/0301796 A1 | 11/2012 | Ohtomo et al. | |
| 2014/0193695 A1 | 7/2014 | Hoshina et al. | |
| 2017/0162902 A1 | 6/2017 | Ohta et al. | |
| 2021/0179441 A1 | 6/2021 | Kanai et al. | |

FOREIGN PATENT DOCUMENTS

| | | | | |
|---|---|---|---|---|
| CN | 102780031 A | 11/2012 | | |
| CN | 107732295 A | 2/2018 | | |
| JP | 2011-129312 A | 6/2011 | | |
| JP | 2017-107665 A | 6/2017 | | |
| JP | 2020-024850 A | 2/2020 | | |
| WO | WO-2009023744 A1 * | 2/2009 | ........ | H01M 10/0436 |
| WO | 2013/136446 A1 | 9/2013 | | |

(Continued)

OTHER PUBLICATIONS

Clarivate Analytics machine translation of CN 107732295 A (Year: 2018).*

(Continued)

*Primary Examiner* — Kevin E Yoon
(74) *Attorney, Agent, or Firm* — Rimon P.C.

(57) ABSTRACT

A solid electrolyte material of the present disclosure consists substantially of: Li; M1, M2; O; and X. Here, the M1 is at least one selected from the group consisting of Ta and Nb, the M2 is at least one selected from the group consisting of Zr, Y, and La, and the X is at least one selected from the group consisting of F, Cl, and Br.

11 Claims, 11 Drawing Sheets

(56)  References Cited

FOREIGN PATENT DOCUMENTS

WO       2020/044897 A1    3/2020

OTHER PUBLICATIONS

EPO machine translation of CN107732295A (Year: 2018).*
J. Mark Weller et al., "Pyrochlore nanocrystals as versatile quasi-single-source precursors to lithium conducting garnets", Journal of Materials Chemistry A, vol. 8, pp. 17405-17410, 2020.
International Search Report issued on Apr. 27, 2021 in International Patent Application No. PCT/JP2021/004837, with English translation.
Thanya Phraewphiphat et al., "Synthesis and Lithium-ion Conductivity of LiSrB2O6F (B = Nb5+, Ta5+) with a Pyrochlore Structure," Journal of the Japan Society of Powder and Powder Metallurgy, 2018, vol. 65, No. 1, pp. 26-33.

* cited by examiner

SOLID ELECTROLYTE MATERIAL AND BATTERY USING SAME

This application is a continuation of PCT/JP2021/004837 filed on Feb. 9, 2021, which claims foreign priority of Japanese Patent Applications No. 2020-080655 filed on Apr. 30, 2020, the entire contents of both of which are incorporated herein by reference.

BACKGROUND OF THE INVENTION

1. Field of the Invention

The present disclosure relates to a solid electrolyte material and a battery using the same.

2. Description of Related Art

JP 2011-129312 A discloses an all-solid-state battery using a sulfide solid electrolyte material.

SUMMARY OF THE INVENTION

The present disclosure aims to provide a novel solid electrolyte material having high utility.

A solid electrolyte material of the present disclosure consists substantially of: Li; M1, M2; O; and X, wherein the M1 is at least one selected from the group consisting of Ta and Nb, the M2 is at least one selected from the group consisting of Zr, Y, and La, and the X is at least one selected from the group consisting of F, Cl, and Br.

The present disclosure provides a novel solid electrolyte material having high utility.

DETAILED DESCRIPTION

Figure 1:
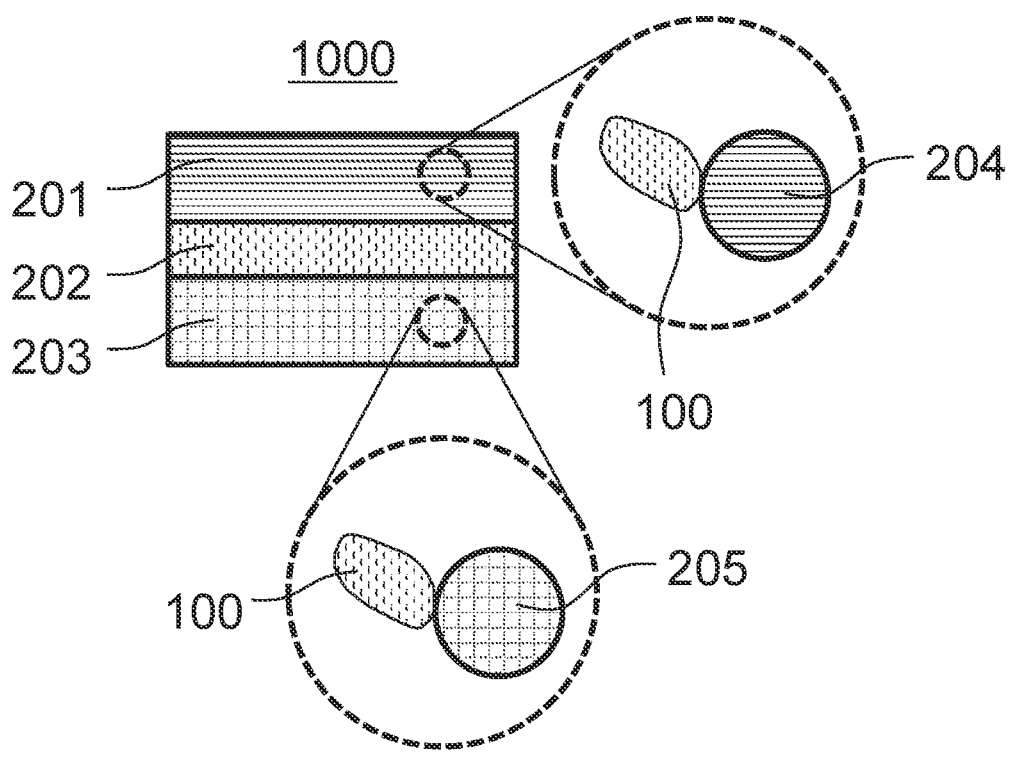
FIG. 1 shows a cross-sectional view of a battery 1000 according to a second embodiment.

Embodiments of the present disclosure will be described below with reference to the drawings. The present disclosure is not limited to the following embodiments.

First Embodiment

A solid electrolyte material according to a first embodiment consists substantially of: Li; M1, M2; O; and X. Here, the M1 is at least one selected from the group consisting of Ta and Nb, the M2 is at least one selected from the group consisting of Zr, Y, and La, and the X is at least one selected from the group consisting of F, Cl, and Br.

Here, the phrase "the solid electrolyte material according to the first embodiment consists substantially of Li, M1, M2, O, and X" means that the ratio (i.e., mole fraction) of the sum of the amounts of substance of Li, M1, M2, O, and X to the total of the amounts of substance of all elements constituting the solid electrolyte material according to the first embodiment is 90% or more. In an example, the ratio may be 95% or more. The solid electrolyte material according to the first embodiment may consist of Li, M1, M2, O, and X.

The solid electrolyte material according to the first embodiment can have, for example, practical lithium-ion conductivity, and can have, for example, high lithium-ion conductivity. Here, high lithium-ion conductivity is, for example, $1 \times 10^{-3}$ mS/cm or more. In other words, the solid electrolyte material according to the first embodiment can have an ionic conductivity of, for example, $1 \times 10^{-3}$ mS/cm or more.

The solid electrolyte material according to the first embodiment can be used to achieve a battery having excellent charge and discharge characteristics. An example of the battery is an all-solid-state battery. The all-solid-state battery may be a primary battery or a secondary battery.

The solid electrolyte material according to the first embodiment can maintain high lithium-ion conductivity within an expected operating temperature range of batteries. Therefore, a battery including the solid electrolyte material according to the first embodiment can stably operate even in an environment where the temperature varies. The operating temperature range of batteries is, for example, from −30° C. to 80° C.

It is desirable that the solid electrolyte material according to the first embodiment should be substantially free of sulfur. The phrase "the solid electrolyte material according to the first embodiment is substantially free of sulfur" means that the solid electrolyte material does not contain sulfur as a constituent element except for sulfur inevitably introduced as impurities. In this case, sulfur introduced as impurities into the solid electrolyte material has an amount of, for example, 1 mol % or less. It is preferable that the solid electrolyte material according to the first embodiment should be free of sulfur. Solid electrolyte materials free of sulfur generate no hydrogen sulfide when exposed to the atmosphere, and accordingly are excellent in safety. The sulfide solid electrolyte material disclosed in JP 2011-129312 A might generate hydrogen sulfide when exposed to the atmosphere.

The solid electrolyte material according to the first embodiment may include a first crystalline phase having a diffraction peak within a range of a diffraction angle 2θ from 11.08° to 14.12° (hereinafter referred to as "first range") in an X-ray diffraction pattern.

The first crystalline phase has high lithium-ion conductivity. Inclusion of the first crystalline phase in the solid electrolyte material according to the first embodiment facilitates formation of paths for lithium ions to diffuse. As a result, the solid electrolyte material according to the first embodiment has high lithium-ion conductivity.

The diffraction peak in the X-ray diffraction pattern is hereinafter referred to simply as "peak".

The X-ray diffraction pattern of the solid electrolyte material according to the first embodiment can be obtained by X-ray diffraction measurement according to the $\theta$-$2\theta$ method using Cu—K$\alpha$ rays (wavelengths of 1.5405 Å and 1.5444 Å, i.e., wavelengths of 0.15405 nm and 0.15444 nm).

The angle of a peak refers to an angle at which the maximum intensity is exhibited for a projecting portion having a full width at half maximum of 10° or less at an SN ratio of 3 or more. The full width at half maximum refers to a width defined by the difference between two diffraction angles at which the intensity is half of $I_{MAX}$ where $I_{MAX}$ is the maximum intensity of the peak. The SN ratio refers to a ratio of a signal S to a background noise N.

To increase the ionic conductivity of the solid electrolyte material, X may be at least one selected from the group consisting of Cl and Br.

To increase the ionic conductivity of the solid electrolyte material, the ratio of the amount of substance of M2 to the sum of the amounts of substance of M1 and M2 may be more than 0% and 60% or less. The ratio of the amount of substance of M2 to the sum of the amounts of substance of M1 and M2 is calculated by a mathematical expression {(the amount of substance of M2)/(the amount of substance of M1+the amount of substance of M2)}×100. The ratio of the amount of substance of M2 to the sum of the amounts of substance of M1 and M2 is hereinafter referred to also as "molar ratio M2/(M1+M2)".

To increase the ionic conductivity of the solid electrolyte material, the molar ratio M2/(M1+M2) may be 5% or more and 50% or less.

To increase the ionic conductivity of the solid electrolyte material, the molar ratio M2/(M1+M2) may be 10% or more and 50% or less.

To increase the electrochemical stability of the solid electrolyte material, X may include F. From the viewpoint of ionic conductivity, the ratio of the amount of substance of F to the amount of substance of X may be 0% or more and 65% or less. The ratio of the amount of substance of F to the amount of substance of X is referred to also as "molar ratio F/X". The molar ratio F/X is calculated by a mathematical expression {(the amount of substance of F)/(the total of the amounts of substance F, Cl, and Br)}×100.

To increase the electrochemical stability of the solid electrolyte material, the molar ratio F/X may be 0% or more and 50% or less.

To further increase the electrochemical stability of the solid electrolyte material, the molar ratio F/X may be 0% or more and 25% or less.

To further increase the electrochemical stability of the solid electrolyte material, the molar ratio F/X may be 0% or more and 5% or less.

To increase the ionic conductivity of the solid electrolyte material, M2 may be Zr. Accordingly, the solid electrolyte material can have not only high ionic conductivity but also high electrochemical stability.

The shape of the solid electrolyte material according to the first embodiment is not limited. The shape is, for example, acicular, spherical, or ellipsoidal. The solid electrolyte material according to the first embodiment may be in particle form. The solid electrolyte material according to the first embodiment may be formed in the shape of a pellet or a plate.

In the case where the shape of the solid electrolyte material according to the first embodiment is in particle form (e.g., spherical), the solid electrolyte material may have a median diameter of 0.1 µm or more and 100 µm or less, and may have a median diameter of 0.5 µm or more and 10 µm or less. This enables favorable dispersion of the solid electrolyte material according to the first embodiment and other materials. The median diameter of particle means the particle diameter (d50) at a cumulative volume equal to 50% in the volumetric particle size distribution. The volumetric particle size distribution can be measured with a laser diffraction measurement device or an image analysis device.

<Method of Manufacturing Solid Electrolyte Material>

The solid electrolyte material according to the first embodiment can be manufactured by the following method.

Raw material powders are prepared and mixed together so as to obtain a target composition. Examples of the raw material powders include an oxide, a hydroxide, a halide, and an acid halide.

For example, assume a case where a solid electrolyte material consists of Li, Ta, Zr, O, and Cl and the molar ratio M2/(M1+M2) and the molar ratio F/X in the raw material mixing are respectively 10% and 0%, i.e., a case where M1 is Ta, M2 is Zr, X is Cl, and the molar ratio M2/(M1+M2) and the molar ratio F/X in the raw material mixing are respectively 10% and 0%. In this case, $Li_2O_2$, $TaCl_5$, and ZrCl4 are mixed as raw material powders at a molar ratio of $Li_2O_2$:$TaCl_5$:$ZrCl_4$=1:1.8:0.2. M1, M2, and X are determined by selecting raw material powders. The molar ratio M2/(M1+M2) and the molar ratio F/X are determined by selecting the mixing ratio of the raw material powders. The raw material powders may be mixed together at a molar ratio adjusted in advance so as to cancel out a composition change which can occur in the synthesis process.

The mixture of the raw material powders is mechanochemically reacted with each other in a mixer such as a planetary ball mill to obtain a reaction product. This method is often referred to as mechanochemical milling. The reaction product may be fired in a vacuum or an inert atmosphere. Alternatively, the mixture may be fired in a vacuum or an inert gas atmosphere to obtain a reaction product. By these methods, the solid electrolyte material according to the first embodiment can be obtained. The inert atmosphere is, for example, an argon atmosphere or a nitrogen atmosphere.

By selecting raw material powders, the mixing ratio of the raw material powders, and the reaction conditions, the peak position, that is, the crystalline phase configuration, of the solid electrolyte material according to the first embodiment can be adjusted to a desired one.

The composition of the solid electrolyte material can be determined, for example, by inductively coupled plasma emission spectrometry or ion chromatography. For example, the compositions of Li, M1, and M2 can be determined by inductively coupled plasma emission spectrometry whereas the composition of X can be determined by ion chromatography.

Second Embodiment

A second embodiment will be described below. The matters described in the first embodiment will be omitted as appropriate.

A battery according to the second embodiment includes a positive electrode, an electrolyte layer, and a negative electrode. The electrolyte layer is disposed between the positive electrode and the negative electrode. At least one selected from the group consisting of the positive electrode, the electrolyte layer, and the negative electrode includes the solid electrolyte material according to the first embodiment.

Owing to including the solid electrolyte material according to the first embodiment, the battery according to the second embodiment has excellent charge and discharge characteristics.

FIG. 1 shows a cross-sectional view of a battery 1000 according to the second embodiment.

The battery 1000 includes a positive electrode 201, an electrolyte layer 202, and a negative electrode 203. The electrolyte layer 202 is disposed between the positive electrode 201 and the negative electrode 203.

The positive electrode 201 includes positive electrode active material particles 204 and solid electrolyte particles 100.

The electrolyte layer 202 includes an electrolyte material. The electrolyte material is, for example, a solid electrolyte material.

The negative electrode 203 includes negative electrode active material particles 205 and the solid electrolyte particles 100.

The solid electrolyte particles 100 are particles including the solid electrolyte material according to the first embodiment. The solid electrolyte particles 100 may be particles including the solid electrolyte material according to the first embodiment as the main component. The particles including the solid electrolyte material according to the first embodiment as the main component refer to particles in which the component contained in the largest amount in molar ratio is the solid electrolyte material according to the first embodiment. The solid electrolyte particles 100 may be particles consisting of the solid electrolyte material according to the first embodiment.

The positive electrode 201 includes a material capable of occluding and releasing metal ions such as lithium ions. The material is, for example, a positive electrode active material (e.g., the positive electrode active material particles 204).

Examples of the positive electrode active material include a lithium-containing transition metal oxide, a transition metal fluoride, a polyanion material, a fluorinated polyanion material, a transition metal sulfide, a transition metal oxysulfide, and a transition metal oxynitride. Examples of the lithium-containing transition metal oxide include Li(Ni, Co, Al)O$_2$, Li(Ni, Co, Mn)O$_2$, and LiCoO$_2$. From the viewpoint of cost and safety of the battery, lithium phosphate may be used as the positive electrode active material.

In the present disclosure, an expression "(A, B, C)" refers to "at least one selected from the group consisting of A, B, and C".

The positive electrode 201 may include, in addition to the solid electrolyte material according to the first embodiment, a transition metal oxyfluoride as the positive electrode active material. Even when the solid electrolyte material according to the first embodiment is fluorinated by the transition metal fluoride, a resistance layer is less likely to be formed. As a result, the battery has high charge and discharge efficiency.

The transition metal oxyfluoride contains oxygen and fluorine. The transition metal oxyfluoride may be, for example, a compound represented by a composition formula Li$_p$Me$_q$O$_m$F$_n$. Here, Me is at least one selected from the group consisting of Mn, Co, Ni, Fe, Al, Cu, V, Nb, Mo, Ti, Cr, Zr, Zn, Na, K, Ca, Mg, Pt, Au, Ag, Ru, W, B, Si, and P, and the following mathematical relations are satisfied: $0.5 \leq p \leq 1.5$; $0.5 \leq q \leq 1.0$; $1 \leq m < 2$; and $0 < n \leq 1$. An example of such a transition metal oxyfluoride is Li$_{1.05}$(Ni$_{0.35}$Co$_{0.35}$Mn$_{0.3}$)$_{0.95}$O$_{1.9}$F$_{0.1}$.

The positive electrode active material particles 204 may have a median diameter of 0.1 μm or more and 100 μm or less. In the case where the positive electrode active material particles 204 have a median diameter of 0.1 μm or more, favorable dispersion of the positive electrode active material particles 204 and the solid electrolyte particles 100 can be achieved in the positive electrode 201. This improves the charge and discharge characteristics of the battery. In the case where the positive electrode active material particles 204 have a median diameter of 100 μm or less, the diffusion rate of lithium in the positive electrode active material particles 204 improves. This enables the battery to operate at a high power.

The positive electrode active material particles 204 may have a median diameter larger than the solid electrolyte particles 100. This enables favorable dispersion of the positive electrode active material particles 204 and the solid electrolyte particles 100.

To increase the energy density and the power output of the battery, in the positive electrode 201, the ratio of the volume of the positive electrode active material particles 204 to the sum of the volume of the positive electrode active material particles 204 and the volume of the solid electrolyte particles 100 may be 0.30 or more and 0.95 or less.

Figure 2:
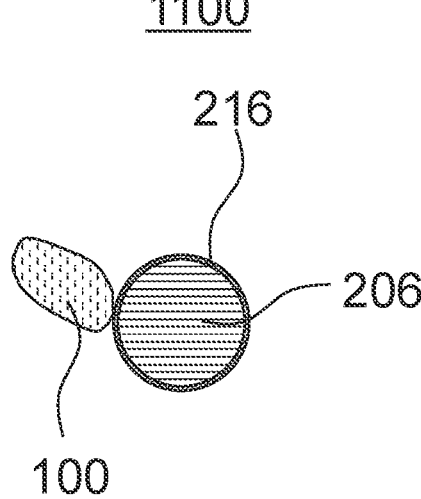
FIG. 2 shows a cross-sectional view of an electrode material 1100 according to the second embodiment.

FIG. 2 shows a cross-sectional view of an electrode material 1100 according to the second embodiment. The electrode material 1100 is included in, for example, the positive electrode 201. To prevent electrode active material particles 206 (i.e., the positive electrode active material) from reacting with the solid electrolyte particles 100, a coating layer 216 may be formed on the surface of each of the electrode active material particles 206. Accordingly, an increase in reaction overvoltage of the battery can be suppressed. Examples of a coating material included in the coating layer 216 include a sulfide solid electrolyte, an oxide solid electrolyte, and a halide solid electrolyte.

In the case where the solid electrolyte particles 100 are those of a sulfide solid electrolyte, the coating material may be the solid electrolyte material according to the first embodiment. The solid electrolyte material according to the first embodiment is less susceptible to oxidation than the sulfide solid electrolyte, and accordingly an increase in reaction overvoltage of the battery can be suppressed.

To increase the energy density and the power output of the battery, the positive electrode 201 may have a thickness of 10 μm or more and 500 μm or less.

The electrolyte layer 202 includes an electrolyte material. The electrolyte material is, for example, a solid electrolyte material. The electrolyte layer 202 may be a solid electrolyte layer.

The electrolyte layer 202 may include the solid electrolyte material according to the first embodiment. The electrolyte layer 202 may consist of the solid electrolyte material according to the first embodiment.

The solid electrolyte material included in the electrolyte layer 202 may consist of a solid electrolyte material different from the solid electrolyte material according to the first embodiment. Examples of the solid electrolyte material different from the solid electrolyte material according to the first embodiment include Li$_2$MgX'$_4$, Li$_2$FeX'$_4$, Li(Al, Ga, In)X'$_4$, Li$_3$(Al, Ga, In)X'$_6$, and LiI. Here, X' is at least one selected from the group consisting of F, Cl, Br, and I.

Hereinafter, the solid electrolyte material according to the first embodiment is referred to as first solid electrolyte material. The solid electrolyte material different from the solid electrolyte material according to the first embodiment is referred to as second solid electrolyte material.

The electrolyte layer 202 may include not only the first solid electrolyte material but also the second solid electrolyte material. The first solid electrolyte material and the second solid electrolyte material may be homogenously dispersed. A layer formed of the first solid electrolyte material and a layer formed of the second solid electrolyte material may be stacked along the stacking direction of the battery 1000.

The electrolyte layer 202 may have a thickness of 1 μm or more and 100 μm or less. In the case where the electrolyte layer 202 has a thickness of 1 μm or more, a short-circuit between the positive electrode 201 and the negative electrode 203 is less likely to occur. In the case where the electrolyte layer 202 has a thickness of 100 μm or less, the battery can operate at a high power.

Another electrolyte layer may be further provided between the electrolyte layer 202 and the negative electrode 203. In other words, a second electrolyte layer may be further provided between the electrolyte layer 202 and the negative electrode 203. For example, in the case where the electrolyte layer 202 includes the first solid electrolyte material, the second electrolyte layer may consist of another solid electrolyte material that is electrochemically more stable than the first solid electrolyte material. Specifically, the reduction potential of the solid electrolyte material constituting the second electrolyte layer may be lower than the reduction potential of the first solid electrolyte material. Accordingly, the first solid electrolyte material can be used without being reduced, so that high ionic conductivity of the first solid electrolyte material can be maintained more stably. As a result, the charge and discharge efficiency of the battery can be improved.

The negative electrode 203 includes a material capable of occluding and releasing metal ions (e.g., lithium ions). The material is, for example, a negative electrode active material (e.g., the negative electrode active material particles 205).

Examples of the negative electrode active material include a metal material, a carbon material, an oxide, a nitride, a tin compound, and a silicon compound. The metal material may be an elemental metal material or an alloy. Examples of the metal material include lithium metal and a lithium alloy. Examples of the carbon material include natural graphite, coke, semi-graphitized carbon, a carbon fiber, spherical carbon, artificial graphite, and amorphous carbon. From the viewpoint of capacity density, preferred examples of the negative electrode active material include silicon (Si), tin (Sn), a silicon compound, and a tin compound.

The negative electrode active material may be selected based on the reduction resistance of the solid electrolyte material included in the negative electrode 203. In the case where the negative electrode 203 includes the first solid electrolyte material, a material capable of occluding and releasing lithium ions at 0.27 V or more with respect to lithium may be used as the negative electrode active material. Using such a material as the negative electrode active material can suppress reduction of the first solid electrolyte material included in the negative electrode 203. As a result, the battery has high charge and discharge efficiency. Examples of the negative electrode active material include a titanium oxide, an indium metal, and a lithium alloy. Examples of the titanium oxide include $Li_4Ti_5O_{12}$, $LiTi_2O_4$, and $TiO_2$.

The negative electrode active material particles 205 may have a median diameter of 0.1 μm or more and 100 μm or less. In the case where the negative electrode active material particles 205 have a median diameter of 0.1 μm or more, favorable dispersion of the negative electrode active material particles 205 and the solid electrolyte particles 100 can be achieved in the negative electrode 203. This improves the charge and discharge characteristics of the battery. In the case where the negative electrode active material particles 205 have a median diameter of 100 μm or less, the diffusion rate of lithium in the negative electrode active material particles 205 improves. This enables the battery to operate at a high power.

The negative electrode active material particles 205 may have a median diameter larger than the solid electrolyte particles 100. This enables favorable dispersion of the negative electrode active material particles 205 and the solid electrolyte particles 100.

To increase the energy density and the power output of the battery, in the negative electrode 203, the ratio of the volume of the negative electrode active material particles 205 to the sum of the volume of the negative electrode active material particles 205 and the volume of the solid electrolyte particles 100 may be 0.30 or more and 0.95 or less.

The electrode material 1100 shown in FIG. 2 is included in, for example, the negative electrode 203. To prevent the electrode active material particles 206 (i.e., the negative electrode active material) from reacting with the solid electrolyte particles 100, the coating layer 216 may be formed on the surface of each of the electrode active material particles 206. Accordingly, the battery has high charge and discharge efficiency. Examples of a coating material included in the coating layer 216 include a sulfide solid electrolyte, an oxide solid electrolyte, a polymer solid electrolyte, and a halide solid electrolyte.

In the case where the solid electrolyte particles 100 are those of the first solid electrolyte material, the coating material may include a sulfide solid electrolyte, an oxide solid electrolyte, or a polymer solid electrolyte. Examples of the sulfide solid electrolyte include $Li_2S$—$P_2S_5$. Examples of the oxide solid electrolyte include trilithium phosphate. Examples of the polymer solid electrolyte include a complex compound of polyethylene oxide and a lithium salt. Examples of such a polymer solid electrolyte include lithium bis(trifluoromethanesulfonyl)imide.

To increase the energy density and the power output of the battery, the negative electrode 203 may have a thickness of 10 μm or more and 500 μm or less.

To increase the ionic conductivity, at least one selected from the group consisting of the positive electrode 201, the electrolyte layer 202, and the negative electrode 203 may include the second solid electrolyte material. Examples of the second solid electrolyte material include a sulfide solid electrolyte, an oxide solid electrolyte, a halide solid electrolyte, and an organic polymer solid electrolyte.

In the present disclosure, the term "sulfide solid electrolyte" refers to a solid electrolyte containing sulfur. The term "oxide solid electrolyte" refers to a solid electrolyte containing oxygen. The oxide solid electrolyte may contain anions other than oxygen (excluding sulfur anions and halogen anions). The term "halide solid electrolyte" refers to a solid electrolyte containing a halogen element and being substantially free of sulfur. The halide solid electrolyte may contain not only a halogen element but also oxygen.

Examples of the sulfide solid electrolyte include $Li_2S$—$P_2S_5$, $Li_2S$—$S_2S_2$, $Li_2S$—$B_2S_3$, $Li_2S$—$GeS_2$, $Li_{3.25}Ge_{0.25}P_{0.75}S_4$, and $Li_{10}GeP_2S_{12}$.

Examples of the oxide solid electrolyte include:
(i) a NASICON solid electrolyte such as $LiTi_2(PO_4)_3$ and element-substituted substances thereof;
(ii) a perovskite solid electrolyte such as $(LaLi)TiO_3$;
(iii) a LISICON solid electrolyte such as $Li_{14}ZnGe_4O_{16}$, $Li_4SiO_4$, and $LiGeO_4$ and element-substituted substances thereof;

(iv) a garnet solid electrolyte such as $Li_7La_3Zr_2O_{12}$ and element-substituted substances thereof; and (v) $Li_3PO_4$ and N-substituted substances thereof.

An example of the halide solid electrolyte is a compound represented by $Li_aMe'_bY_cZ_6$. Here, mathematical relations a+mb+3c=6 and c>0 are satisfied. Me' is at least one selected from the group consisting of metalloid elements and metal elements other than Li and Y. Z is at least one selected from the group consisting of F, Cl, Br, and I. The value m represents the valence of Me'.

The "metalloid elements" are B, Si, Ge, As, Sb, and Te.

The "metal elements" are: all the elements included in Groups 1 to 12 of the periodic table (excluding hydrogen); and all the elements included in Groups 13 to 16 of the periodic table (excluding B, Si, Ge, As, Sb, Te, C, N, P, O, S, and Se).

To increase the ionic conductivity of the halide solid electrolyte, Me' may be at least one selected from the group consisting of Mg, Ca, Sr, Ba, Zn, Sc, Al, Ga, Bi, Zr, Hf, Ti, Sn, Ta, and Nb.

Examples of the halide solid electrolyte include $Li_3YCl_6$ and $Li_3YBr_6$.

In the case where the electrolyte layer 202 includes the first solid electrolyte material, the negative electrode 203 may include a sulfide solid electrolyte. Accordingly, the sulfide solid electrolyte that is electrochemically stable with respect to the negative electrode active material suppresses contact between the first solid electrolyte material and the negative electrode active material. As a result, the battery has low internal resistance.

An example of the organic polymer solid electrolyte is a compound of a polymer compound and a lithium salt. The polymer compound may have an ethylene oxide structure. A polymer compound having an ethylene oxide structure can contain a large amount of a lithium salt, and accordingly has higher ionic conductivity.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_6)_2$, $LiN(SO_2CF_3)(SO_2C_4F_9)$, and $LiC(SO_2CF_3)_3$. One lithium salt selected from these may be used alone. Alternatively, a mixture of two or more lithium salts selected from these may be used.

To facilitate transfer of lithium ions and thereby improve the output characteristics of the battery, at least one selected from the group consisting of the positive electrode 201, the electrolyte layer 202, and the negative electrode 203 may include a nonaqueous electrolyte solution, a gel electrolyte, or an ionic liquid.

The nonaqueous electrolyte solution contains a nonaqueous solvent and a lithium salt dissolved in the nonaqueous solvent. Examples of the nonaqueous solvent include a cyclic carbonate solvent, a linear carbonate solvent, a cyclic ether solvent, a linear ether solvent, a cyclic ester solvent, a linear ester solvent, and a fluorinated solvent. Examples of the cyclic carbonate solvent include ethylene carbonate, propylene carbonate, and butylene carbonate. Examples of the linear carbonate solvent include dimethyl carbonate, ethyl methyl carbonate, and diethyl carbonate. Examples of the cyclic ether solvent include tetrahydrofuran, 1,4-dioxane, and 1,3-dioxolane. Examples of the linear ether solvent include 1,2-dimethoxyethane and 1,2-diethoxyethane. Examples of the cyclic ester solvent include γ-butyrolactone. Examples of the linear ester solvent include methyl acetate. Examples of the fluorinated solvent include fluoroethylene carbonate, methyl fluoropropionate, fluorobenzene, fluoroethyl methyl carbonate, and fluorodimethylene carbonate. One nonaqueous solvent selected from these may be used alone. Alternatively, a mixture of two or more nonaqueous solvents selected from these may be used.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these may be used alone. Alternatively, a mixture of two or more lithium salts selected from these may be used. The concentration of the lithium salt may fall within a range, for example, from 0.5 mol/L to 2 mol/L.

As the gel electrolyte, a polymer material impregnated with a nonaqueous electrolyte solution can be used. Examples of the polymer material include polyethylene oxide, polyacrylonitrile, polyvinylidene fluoride, polymethyl methacrylate, and a polymer having an ethylene oxide bond.

Examples of cations contained in the ionic liquid include:
(i) aliphatic linear quaternary salts such as tetraalkylammoniums and tetraalkylphosphoniums;
(ii) aliphatic cyclic ammoniums such as pyrrolidiniums, morpholiniums, imidazoliniums, tetrahydropyrimidiniums, piperaziniums, and piperidiniums; and
(iii) nitrogen-containing heterocyclic aromatic cations such as pyridiniums and imidazoliums.

Examples of anions contained in the ionic liquid include $PF_6{}^—$, $BF_4{}^—$, $SbF_6{}^—$, $AsF_6{}^—$, $SO_3CF_3{}^—$, $N(SO_2CF_3)_2{}^—$, $N(SO_2C_2F_5)_2{}^—$, $N(SO_2CF_3)(SO_2C_4F_9){}^—$, and $C(SO_2CF_3)_3{}^—$.

The ionic liquid may contain a lithium salt.

To increase the adhesion between particles, at least one selected from the group consisting of the positive electrode 201, the electrolyte layer 202, and the negative electrode 203 may contain a binder.

Examples of the binder include polyvinylidene fluoride, polytetrafluoroethylene, polyethylene, polypropylene, aramid resin, polyamide, polyimide, polyamide-imide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyethersulfone, hexafluoropolypropylene, styrene-butadiene rubber, and carboxymethylcellulose. As the binder, a copolymer may be used. Examples of the binder include a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more selected from the above materials may be used.

To increase the electronic conductivity, at least one selected from the group consisting of the positive electrode 201 and the negative electrode 203 may contain a conductive additive.

Examples of the conductive additive include:
(i) graphites such as natural graphite and artificial graphite;
(ii) carbon blacks such as acetylene black and ketjen black;
(iii) conductive fibers such as a carbon fiber and a metal fiber;
(iv) fluorinated carbon;
(v) metal powders such as an aluminum powder;
(vi) conductive whiskers such as a zinc oxide whisker and a potassium titanate whisker;
(vii) a conductive metal oxide such as titanium oxide; and (viii) a conductive polymer compound such as polyaniline compound, polypyrrole compound, and polythiophene compound. To reduce the cost, the conductive additive in (i) or (ii) above may be used.

Examples of the shape of the battery according to the second embodiment include a coin type, a cylindrical type, a prismatic type, a sheet type, a button type, a flat type, and a stack type.

The battery according to the second embodiment may be manufactured, for example, by preparing a material for forming a positive electrode, a material for forming an electrolyte layer, and a material for forming a negative electrode, and producing by a known method a stack in which the positive electrode, the electrolyte layer, and the negative electrode are disposed in this order.

EXAMPLES

The present disclosure will be described below in more detail with reference to examples.

Example 1

[Production of Solid Electrolyte Material]

In a dry atmosphere with a dew point of −30° C. or less (hereinafter referred to as "dry atmosphere"), $Li_2O_2$, $TaCl_5$, and $ZrCl_4$ were prepared as raw material powders at a molar ratio of $Li_2O_2:TaCl_5:ZrCl_4=1:1.8:0.2$. These materials were pulverized and mixed in a mortar to obtain a mixture. The obtained mixture was milled with a planetary ball mill (Type P-7 manufactured by Fritsch GmbH) at 600 rpm for 24 hours. Thus, a powder of a solid electrolyte material according to Example 1 was obtained.

[Ionic Conductivity Evaluation]

Figure 3:
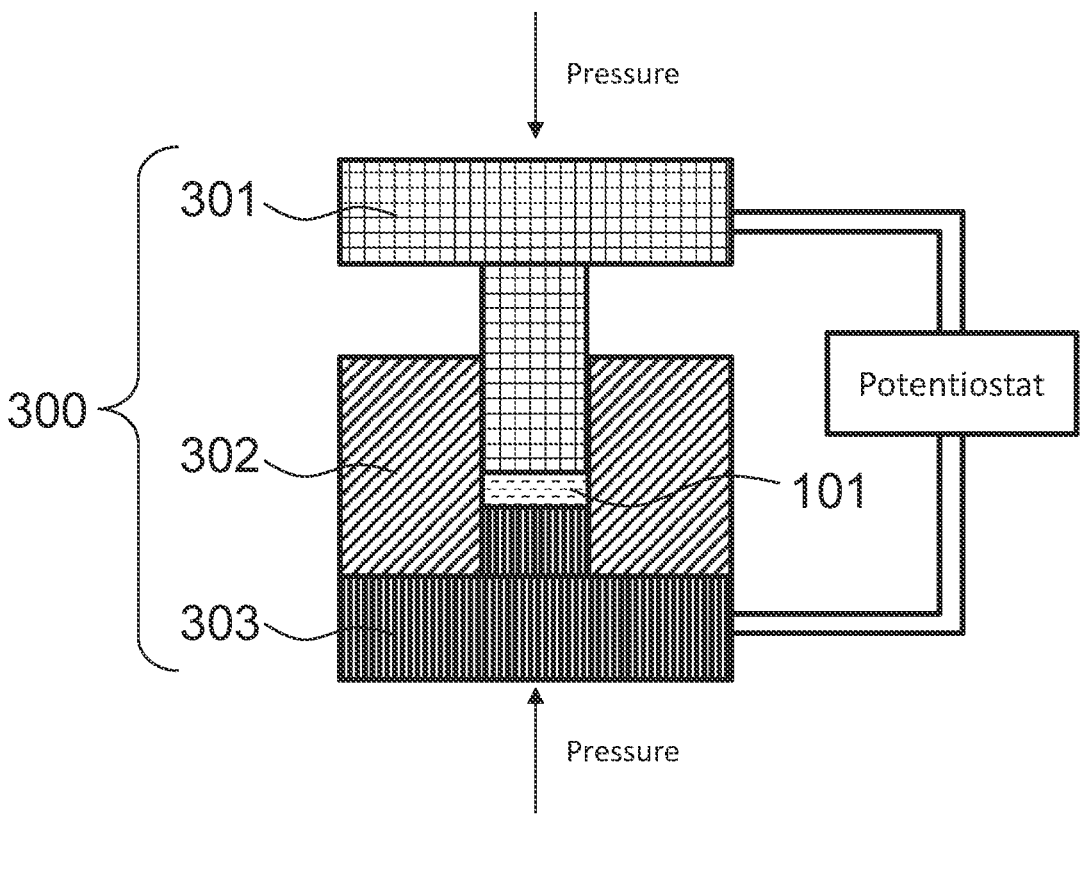
FIG. 3 shows a schematic view of a pressure-molding die 300 used to evaluate the ionic conductivity of solid electrolyte materials.

FIG. 3 shows a schematic view of a pressure-molding die 300 used to evaluate the ionic conductivity of solid electrolyte materials.

The pressure-molding die 300 included an upper punch 301, a die 302, and a lower punch 303. The die 302 was formed of insulating polycarbonate. The upper punch 301 and the lower punch 303 were each formed of electronically conductive stainless steel.

The pressure-molding die 300 shown in FIG. 3 was used to measure the ionic conductivity of the solid electrolyte material according to Example 1 by the following method.

In a dry atmosphere, the powder of the solid electrolyte material according to Example 1 was charged into the pressure-molding die 300. Inside the pressure-molding die 300, a pressure of 300 MPa was applied to the solid electrolyte material according to Example 1 (i.e., a solid electrolyte material powder 101 in FIG. 3) with the upper punch 301 and the lower punch 303.

While the pressure was being applied, the upper punch 301 and the lower punch 303 were connected to a potentiostat (VersaSTAT4 manufactured by Princeton Applied Research) equipped with a frequency response analyzer. The upper punch 301 was connected to a working electrode and a potential measurement terminal. The lower punch 303 was connected to a counter electrode and a reference electrode. The ionic conductivity of the solid electrolyte material according to Example 1 was measured at room temperature by an electrochemical impedance measurement method. As a result, the ionic conductivity measured at 22° C. was 4.4 mS/cm.

[X-Ray Diffraction Measurement]

Figure 4A:
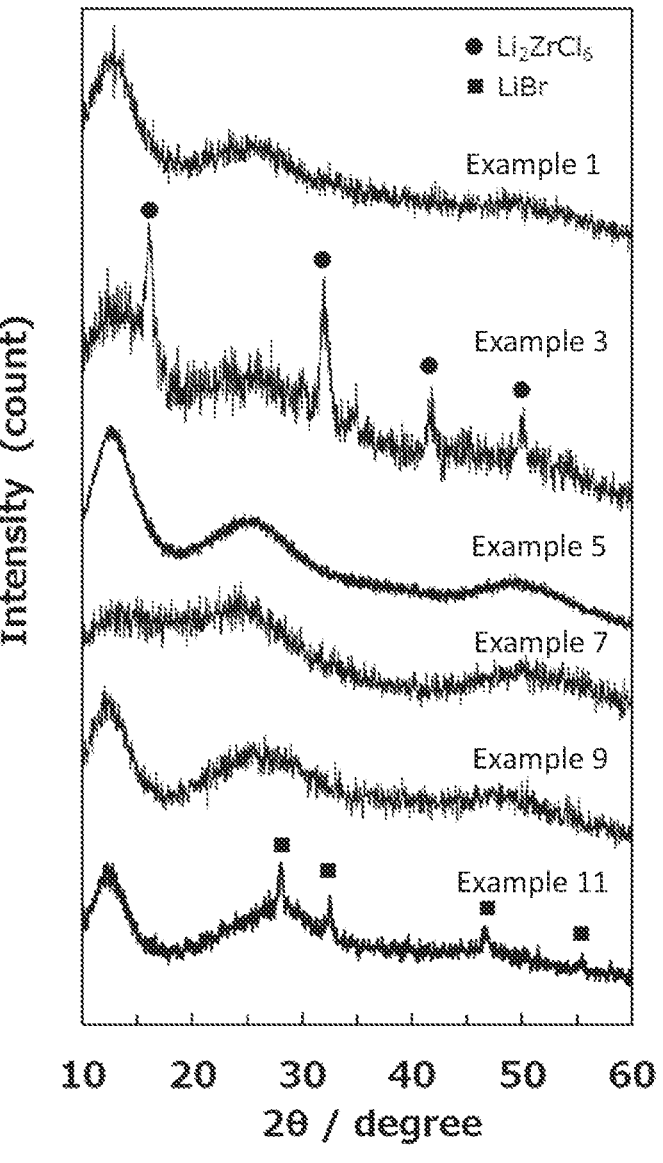
FIG. 4A is a graph showing X-ray diffraction patterns of solid electrolyte materials according to Examples 1, 3, 5, 7, 9, and 11.

FIG. 4A is a graph showing an X-ray diffraction pattern of the solid electrolyte material according to Example 1. The results shown in the figure were measured by the following method.

In a dry atmosphere with a dew point of −45° C. or less, the X-ray diffraction pattern of the solid electrolyte material according to Example 1 was measured with an X-ray diffractometer (MiniFlex 600 manufactured by Rigaku Corporation). X rays sources used were Cu—Kα rays (wavelengths of 1.5405 Å and 1.5444 Å).

The solid electrolyte material according to Example 1 had a peak at 12.70°.

[Production of Battery]

In an argon atmosphere with a dew point of −60° C. or less, the solid electrolyte material according to Example 1 and $LiCoO_2$, which is a positive electrode active material, were prepared at a volume ratio of 50:50. These materials were mixed together in a mortar to obtain a positive electrode mixture.

In an insulating cylinder having an inner diameter of 9.5 mm, the solid electrolyte material according to Example 1 (120 mg) and the above positive electrode mixture (10.6 mg) were stacked to obtain a stack. A pressure of 360 MPa was applied to this stack to form a solid electrolyte layer and a first electrode. The solid electrolyte layer had a thickness of 500 μm.

Next, a Li—In alloy having a thickness of 200 μm was stacked on the solid electrolyte layer. A pressure of 80 MPa was applied to this stack to form a second electrode.

The first electrode was a positive electrode, and the second electrode was a negative electrode.

Stainless steel current collectors were attached to the first electrode and the second electrode, and current collector leads were attached to the current collectors.

Finally, an insulating ferrule was used to block the inside of the insulating cylinder from the outside air atmosphere and seal the cylinder.

Thus, a battery according to Example 1 was obtained.

[Charge and Discharge Test]

Figure 9:
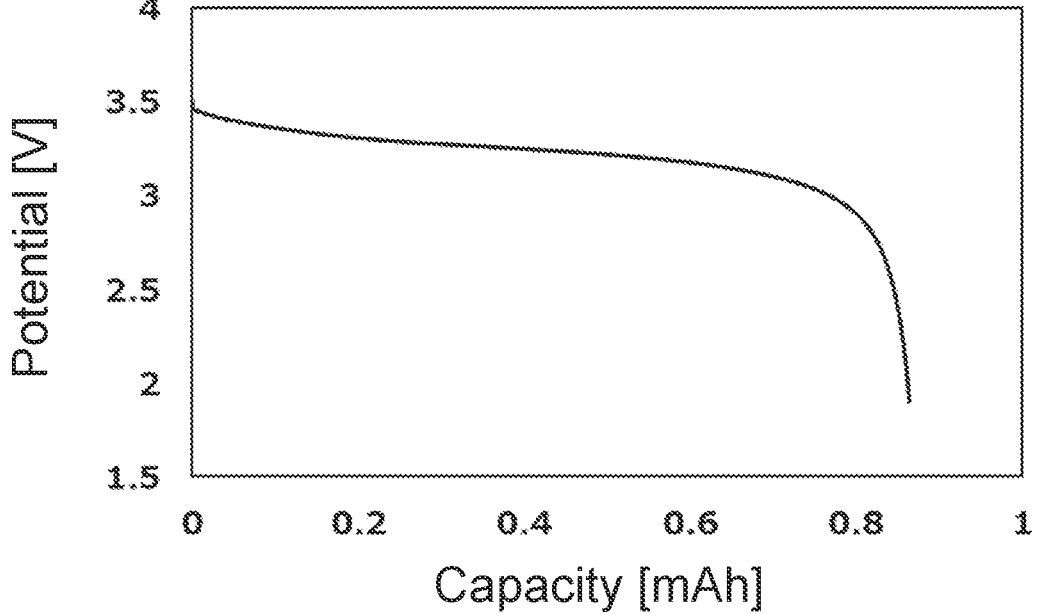
FIG. 9 is a graph showing the initial discharge characteristics of a battery according to Example 1.

FIG. 9 is a graph showing the initial discharge characteristics of the battery according to Example 1. The results shown in FIG. 9 were measured by the following method.

The battery according to Example 1 was placed in a thermostatic chamber at 25° C.

The battery according to Example 1 was charged to a voltage of 3.6 V at a current value of 56 μA. The current density corresponds to 0.05 C rate.

Next, the battery was discharged to a voltage of 1.9 V at a current value of 56 μA.

The battery according to Example 1 was charged and discharged at room temperature.

As a result of the charge and discharge test, the battery according to Example 1 had an initial discharge capacity of 0.86 mAh.

Examples 2 to 31 and Comparative Examples 1 to 2

[Production of Solid Electrolyte Material]

In Example 2, $Li_2O_2$, $TaCl_5$, and $ZrCl_4$ were prepared as raw material powders at a molar ratio of $Li_2O_2:TaCl_5:ZrCl_4=1:1.8:0.2$. The mixture was milled and then fired at 200° C. for 3 hours.

In Example 3, $Li_2O_2$, $TaCl_5$, and $ZrCl_4$ were prepared as raw material powders at a molar ratio of $Li_2O_2:TaCl_5:ZrCl_4=1:1:1$.

In Example 4, $Li_2O_2$, $TaCl_5$, and $ZrCl_4$ were prepared as raw material powders at a molar ratio of $Li_2O_2$:$TaCl_5$:$ZrCl_4$=1:1:1. The mixture was milled and then fired at 200° C. for 3 hours.

In Example 5, $Li_2O_2$, $TaCl_5$, $ZrCl_4$, and $TaF_5$ were prepared as raw material powders at a molar ratio of $Li_2O_2$:$TaCl_5$:$ZrCl_4$:$TaF_5$=1:1.702:0.2:0.098.

In Example 6, $Li_2O_2$, $TaCl_5$, $ZrCl_4$, and $TaF_5$ were prepared as raw material powders at a molar ratio of $Li_2O_2$:$TaCl_5$:$ZrCl_4$:$TaF_5$=1:1.702:0.2:0.098. The mixture was milled and then fired at 200° C. for 3 hours.

In Example 7, $Li_2O_2$, $TaCl_5$, $ZrCl_4$, and $TaF_5$ were prepared as raw material powders at a molar ratio of $Li_2O_2$:$TaCl_5$:$ZrCl_4$:$TaF_5$=1:0.82:0.2:0.98.

In Example 8, $Li_2O_2$, $TaCl_5$, $ZrCl_4$, and $TaF_5$ were prepared as raw material powders at a molar ratio of $Li_2O_2$:$TaCl_5$:$ZrCl_4$:$TaF_5$=1:0.82:0.2:0.98. The mixture was milled and then fired at 200° C. for 3 hours.

In Example 9, $Li_2O_2$, $TaCl_5$, $ZrCl_4$, and $TaBr_5$ were prepared as raw material powders at a molar ratio of $Li_2O_2$:$TaCl_5$:$ZrCl_4$:$TaBr_5$=1:0.82:0.2:0.98.

In Example 10, $Li_2O_2$, $TaCl_5$, $ZrCl_4$, and $TaBr_5$ were prepared as raw material powders at a molar ratio of $Li_2O_2$:$TaCl_5$:$ZrCl_4$:$TaBr_5$=1:0.82:0.2:0.98. The mixture was milled and then fired at 200° C. for 3 hours.

In Example 11, $Li_2O_2$, $TaBr_5$, and $ZrBr_4$ were prepared as raw material powders at a molar ratio of $Li_2O_2$:$TaBr_5$:$ZrBr_4$=1:1.8:0.2.

In Example 12, $Li_2O_2$, $TaBr_5$, and $ZrBr_4$ were prepared as raw material powders at a molar ratio of $Li_2O_2$:$TaBr_5$:$ZrBr_4$=1:1.8:0.2. The mixture was milled and then fired at 200° C. for 3 hours.

In Example 13, $Li_2O_2$, $TaCl_5$, and $YCl_3$ were prepared as raw material powders at a molar ratio of $Li_2O_2$:$TaCl_5$:$YCl_3$=1:1.8:0.2.

In Example 14, $Li_2O_2$, $TaCl_5$, and $YCl_3$ were prepared as raw material powders at a molar ratio of $Li_2O_2$:$TaCl_5$:$YCl_3$=1:1.8:0.2. The mixture was milled and then fired at 200° C. for 3 hours.

In Example 15, $Li_2O_2$, $TaCl_5$, and $YCl_3$ were prepared as raw material powders at a molar ratio of $Li_2O_2$:$TaCl_5$:$YCl_3$=1:1.2:0.8.

In Example 16, $Li_2O_2$, $TaCl_5$, and $YCl_3$ were prepared as raw material powders at a molar ratio of $Li_2O_2$:$TaCl_5$:$YCl_3$=1:1.2:0.8. The mixture was milled and then fired at 200° C. for 3 hours.

In Example 17, $Li_2O_2$, $TaCl_5$, and $LaCl_3$ were prepared as raw material powders at a molar ratio of $Li_2O_2$:$TaCl_5$:$LaCl_3$=1:1.8:0.2.

In Example 18, $Li_2O_2$, $TaCl_5$, and $LaCl_3$ were prepared as raw material powders at a molar ratio of $Li_2O_2$:$TaCl_5$:$LaCl_3$=1:1.8:0.2. The mixture was milled and then fired at 200° C. for 3 hours.

In Example 19, $Li_2O_2$, $TaCl_5$, and $LaCl_3$ were prepared as raw material powders at a molar ratio of $Li_2O_2$:$TaCl_5$:$LaCl_3$=1:1.4:0.6.

In Example 20, $Li_2O_2$, $NbCl_5$, and $ZrCl_4$ were prepared as raw material powders at a molar ratio of $Li_2O_2$:$NbCl_5$:$ZrCl_4$=1:1.8:0.2.

In Example 21, $Li_2O_2$, $NbCl_5$, and $ZrCl_4$ were prepared as raw material powders at a molar ratio of $Li_2O_2$:$NbCl_5$:$ZrCl_4$ of 1:1.8:0.2. The mixture was milled and then fired at 200° C. for 3 hours.

In Example 22, $Li_2O_2$, $NbCl_5$, and $ZrCl_4$ were prepared as raw material powders at a molar ratio of $Li_2O_2$:$NbCl_5$:$ZrCl_4$=1:1.2:0.8.

In Example 23, $Li_2O_2$, $NbCl_5$, and $ZrCl_4$ were prepared as raw material powders at a molar ratio of $Li_2O_2$:$NbCl_5$:$ZrCl_4$=1:1.2:0.8. The mixture was milled and then fired at 200° C. for 3 hours.

In Example 24, $Li_2O_2$, $NbCl_5$, $ZrCl_4$, and $NbF_5$ were prepared as raw material powders at a molar ratio of $Li_2O_2$:$NbCl_5$:$ZrCl_4$:$NbF_5$=1:1.31:0.2:0.49.

In Example 25, $Li_2O_2$, $NbCl_5$, $ZrCl_4$, and $NbF_5$ were prepared as raw material powders at a molar ratio of $Li_2O_2$:$NbCl_5$:$ZrCl_4$:$NbF_5$=1:1.31:0.2:0.49. The mixture was milled and then fired at 200° C. for 3 hours.

In Example 26, $Li_2O_2$, $NbCl_5$, $ZrCl_4$, and $NbBr_5$ were prepared as raw material powders at a molar ratio of $Li_2O_2$:$NbCl_5$:$ZrCl_4$:$Br$=1:1.31:0.2:0.49.

In Example 27, $Li_2O_2$, $NbCl_5$, $ZrCl_4$, and $NbBr_5$ were prepared as raw powders at a molar ratio of $Li_2O_2$:$NbCl_5$:$ZrCl_4$:$NbBr_5$=1:1.31:0.2:0.49. The mixture was milled and then fired at 200° C. for 3 hours.

In Example 28, $Li_2O_2$, $NbCl_5$, and $YCl_3$ were prepared as raw material powders at a molar ratio of $Li_2O_2$:$NbCl_5$:$YCl_3$=1:1.2:0.8.

In Example 29, $Li_2O_2$, $NbCl_5$, and $YCl_3$ were prepared as raw material powders at a molar ratio of $Li_2O_2$:$NbCl_5$:$YCl_3$=1:1.2:0.8. The mixture was milled and then fired at 200° C. for 3 hours.

In Example 30, $Li_2O_2$, $NbCl_5$, and $LaCl_3$ were prepared as raw material powders at a molar ratio of $Li_2O_2$:$NbCl_5$:$LaCl_3$=1:1.8:0.2.

In Example 31, $Li_2O_2$, $NbCl_5$, and $LaCl_3$ were prepared as raw material powders at a molar ratio of $Li_2O_2$:$NbCl_5$:$LaCl_3$=1:1.8:0.2. The mixture was milled and then fired at 200° C. for 3 hours.

In Comparative Example 1, $Li_2O_2$ and LiCl were prepared as raw material powders at a molar ratio of $Li_2O_2$:LiCl=1:1.

In Comparative Example 2, LiCl and $TaCl_5$ were prepared as raw material powders at a molar ratio of LiCl:$TaCl_5$=1:1.

Solid electrolyte materials according to Examples 2 to 31 and Comparative Examples 1 to 2 were obtained in the same manner as in Example 1 except for the matters described above.

[Ionic Conductivity Evaluation]

The ionic conductivity was measured for the solid electrolyte materials according to Examples 2 to 31 and Comparative Examples 1 to 2 in the same manner as in Example 1. The measurement results are shown in Tables 1 and 2.

[X-Ray Diffraction]

Figure 4B:
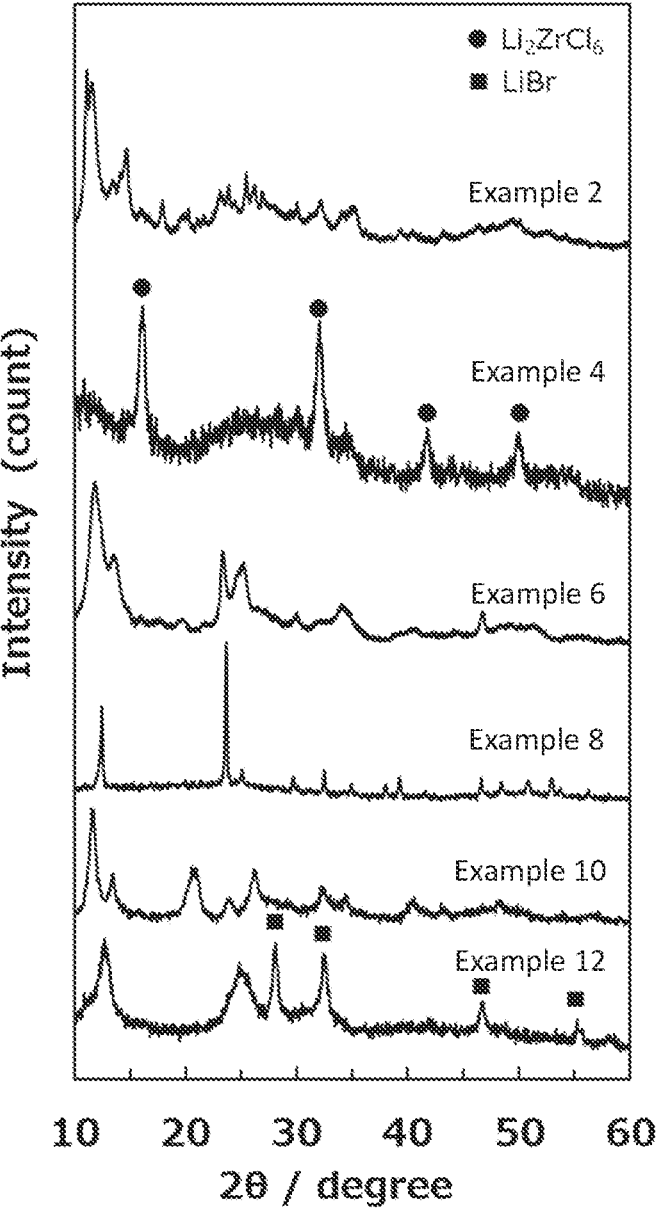
FIG. 4B is a graph showing X-ray diffraction patterns of solid electrolyte materials according to Examples 2, 4, 6, 8, 10, and 12.
Figure 5A:
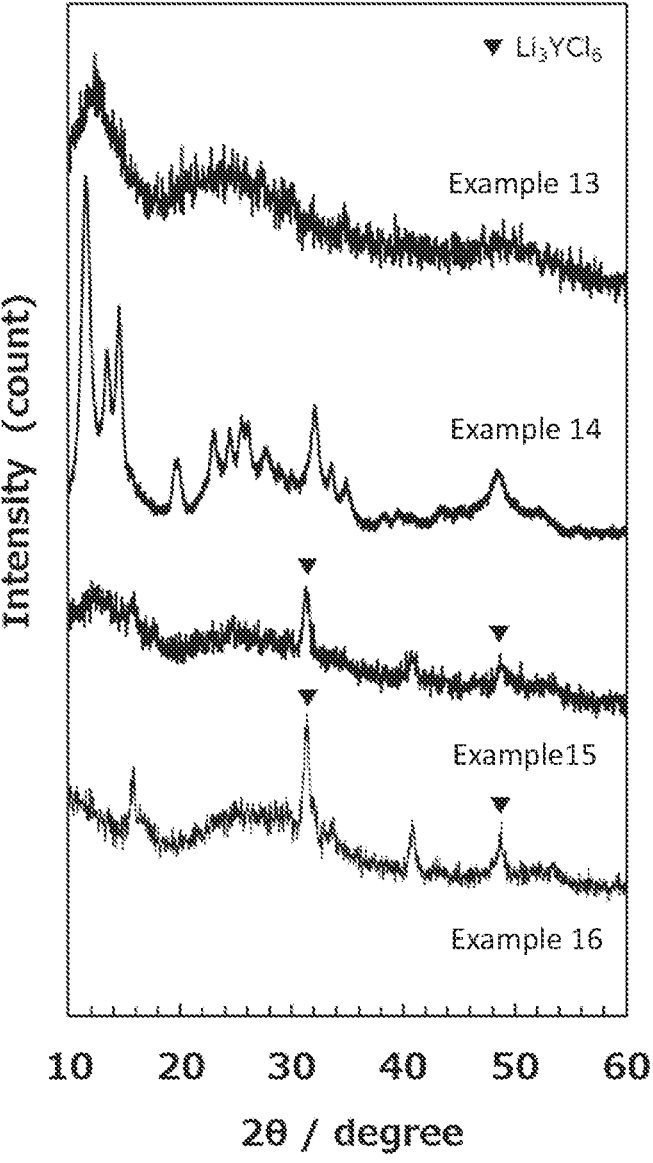
FIG. 5A is a graph showing X-ray diffraction patterns of solid electrolyte materials according to Examples 13 to 16.
Figure 5B:
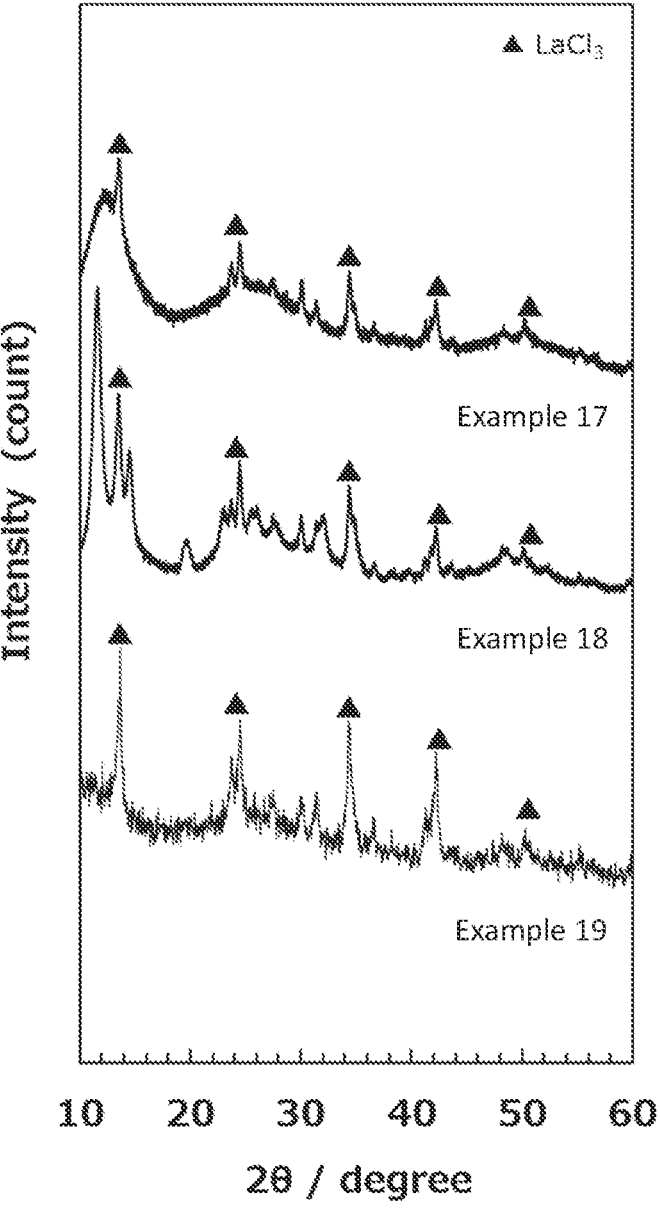
FIG. 5B is a graph showing X-ray diffraction patterns of solid electrolyte materials according to Examples 17 to 19.
Figure 6A:
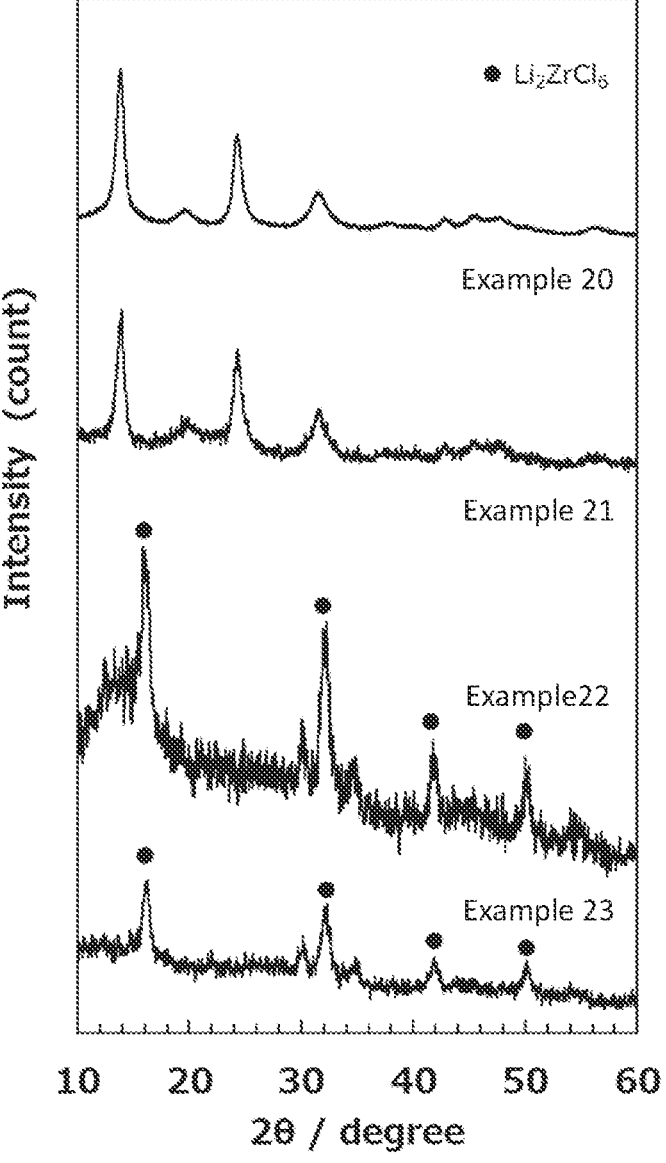
FIG. 6A is a graph showing X-ray diffraction patterns of solid electrolyte materials according to Examples 20 to 23.
Figure 6B:
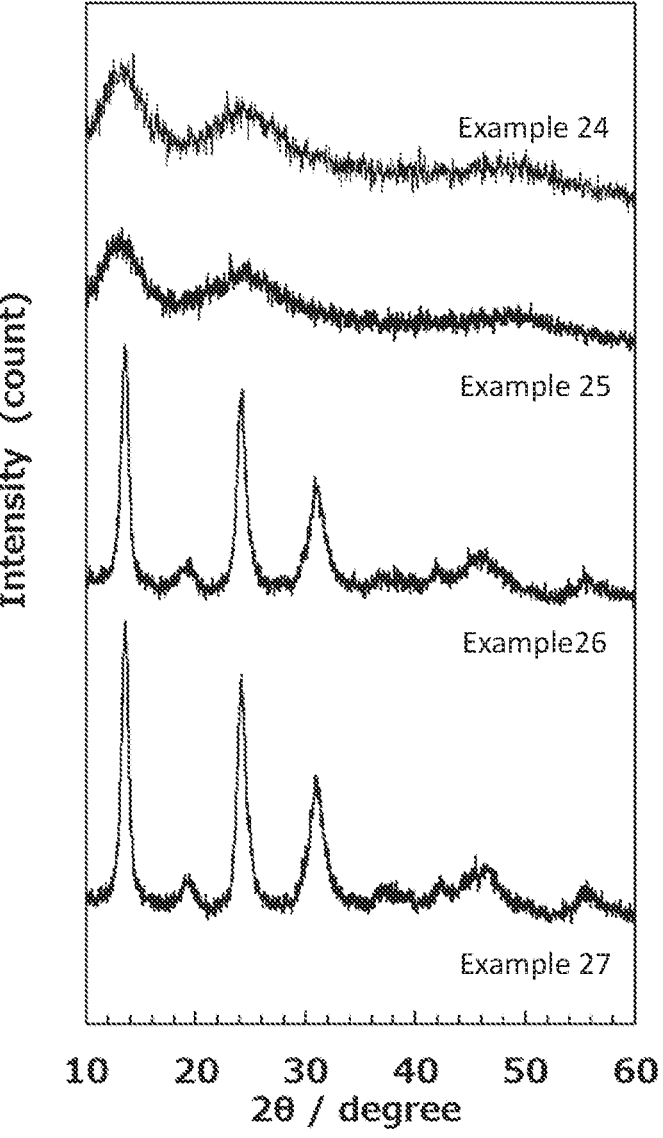
FIG. 6B is a graph showing X-ray diffraction patterns of solid electrolyte materials according to Examples 24 to 27.
Figure 7:
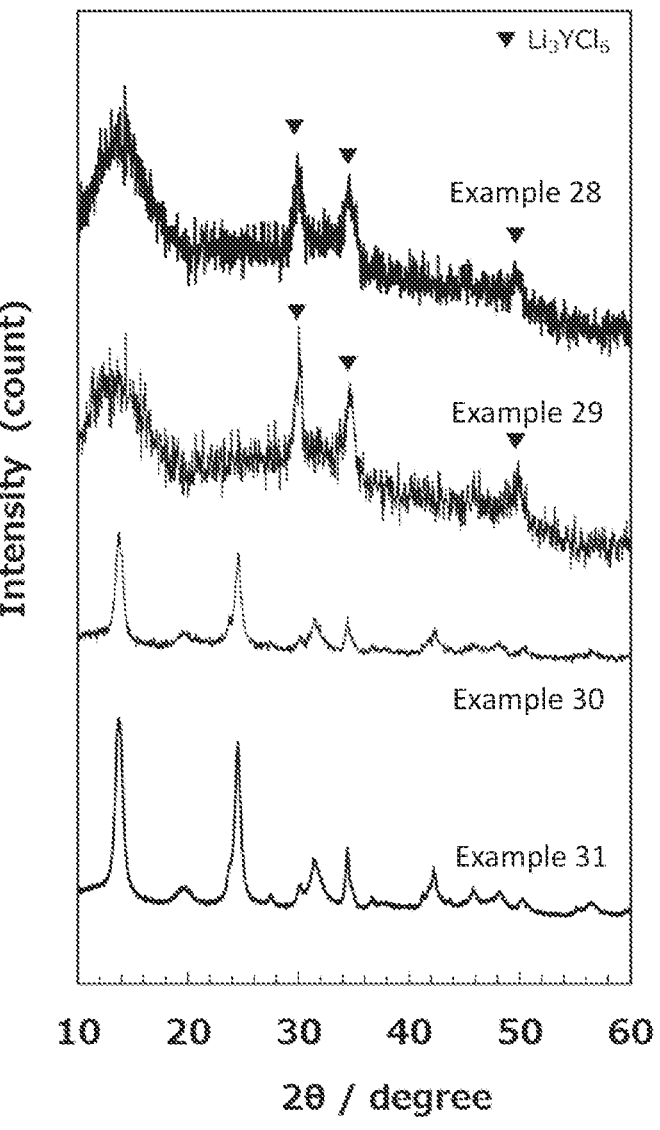
FIG. 7 is a graph showing X-ray diffraction patterns of solid electrolyte materials according to Examples 28 to 31.
Figure 8:
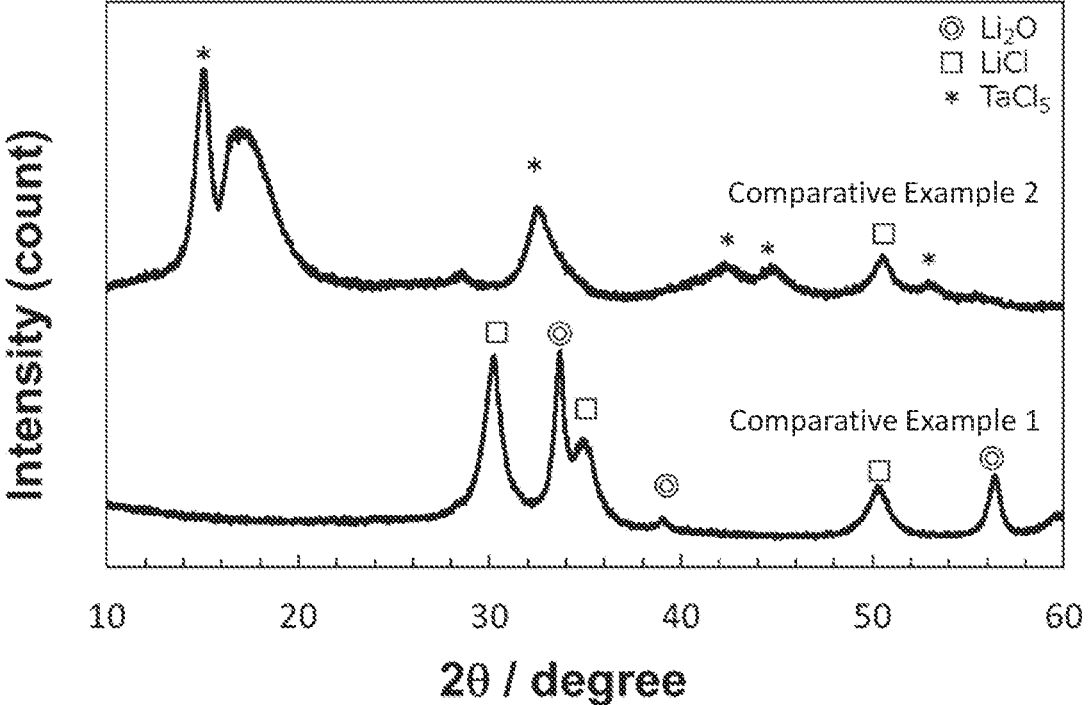
FIG. 8 is a graph showing X-ray diffraction patterns of solid electrolyte materials according to Comparative Examples 1 and 2.

The X-ray diffraction pattern was measured for the solid electrolyte materials according to Examples 2 to 31 and Comparative Examples 1 to 2 in the same manner as in Example 1. FIG. 4A is a graph showing the X-ray diffraction patterns of the solid electrolyte materials according to Examples 3, 5, 7, 9, and 11. FIG. 4B is a graph showing the X-ray diffraction patterns of the solid electrolyte materials according to Examples 2, 4, 6, 8, 10, and 12. FIG. 5A is a graph showing the X-ray diffraction patterns of the solid electrolyte materials according to Examples 13 to 16. FIG. 5B is a graph showing the X-ray diffraction patterns of the solid electrolyte materials according to Examples 17 to 19. FIG. 6A is a graph showing the X-ray diffraction patterns of the solid electrolyte materials according to Examples 20 to 23. FIG. 6B is a graph showing the X-ray diffraction patterns of the solid electrolyte materials according to Examples 24 to 27. FIG. 7 is a graph showing the X-ray diffraction patterns of the solid electrolyte materials according to Examples 28 to 31. FIG. 8 is a graph showing the X-ray diffraction patterns of the solid electrolyte materials according to Comparative Examples 1 and 2.

The solid electrolyte material according to Example 2 had a peak at 11.13°.

The solid electrolyte material according to Example 3 had no peak within the first range.

The solid electrolyte material according to Example 4 had no peak within the first range.

The solid electrolyte material according to Example 5 had a peak at 12.75°.

The solid electrolyte material according to Example 6 had a peak at 11.83°.

The solid electrolyte material according to Example 7 had a peak at 13.82°.

The solid electrolyte material according to Example 8 had a peak at 12.45°.

The solid electrolyte material according to Example 9 had a peak at 12.50°.

The solid electrolyte material according to Example 10 had a peak at 11.65°.

The solid electrolyte material according to Example 11 had a peak at 12.52°, and further had peaks attributed to LiBr as well.

The solid electrolyte material according to Example 12 had a peak at 12.72°, and further had peaks attributed to LiBr as well.

The solid electrolyte material according to Example 13 had a peak at 12.50°.

The solid electrolyte material according to Example 14 had a peak at 11.57°.

The solid electrolyte material according to Example 15 had a peak at 12.41°.

The solid electrolyte material according to Example 16 had no peak within the first range.

The solid electrolyte material according to Example 17 had a peak at 12.30°.

The solid electrolyte material according to Example 18 had a peak at 11.66°.

The solid electrolyte material according to Example 19 had no peak within the first range.

The solid electrolyte material according to Example 20 had a peak at 13.85°.

The solid electrolyte material according to Example 21 had a peak at 13.89°.

The solid electrolyte material according to Example 22 had a peak at 13.53°.

The solid electrolyte material according to Example 23 had no peak within the first range.

The solid electrolyte material according to Example 24 had a peak at 13.25°.

The solid electrolyte material according to Example 25 had a peak at 13.12°.

The solid electrolyte material according to Example 26 had a peak at 13.65°.

The solid electrolyte material according to Example 27 had a peak at 13.60°.

The solid electrolyte material according to Example 28 had a peak at 14.07°.

The solid electrolyte material according to Example 29 had a peak at 13.50°.

The solid electrolyte material according to Example 30 had a peak at 13.75°.

The solid electrolyte material according to Example 31 had a peak at 13.76°.

Comparative Examples 1 and 2 had no peak within the first range.

TABLE 1

| | Constituent element | Molar ratio M2/(M1 + M2) [%] | Molar ratio F/X [%] | Molar ratio Br/X [%] | Thermal treatment | Peak within first range [°] | Ionic conductivity [mS/cm] |
|---|---|---|---|---|---|---|---|
| Example 1 | Li—Ta—Zr—O—Cl | 10 | 0 | 0 | No | 12.70 | 4.4 |
| Example 2 | | 10 | 0 | 0 | Yes | 11.13 | 3.2 |
| Example 3 | | 50 | 0 | 0 | No | — | $5.1 \times 10^{-1}$ |
| Example 4 | | 50 | 0 | 0 | Yes | — | $4.9 \times 10^{-1}$ |
| Example 5 | Li—Ta—Zr—O—Cl—F | 10 | 5 | 0 | No | 12.75 | 3.9 |
| Example 6 | | 10 | 5 | 0 | Yes | 11.83 | 4.3 |
| Example 7 | | 10 | 50 | 0 | No | 13.82 | $1.0 \times 10^{-2}$ |
| Example 8 | | 10 | 50 | 0 | Yes | 12.45 | $1.2 \times 10^{-2}$ |
| Example 9 | Li—Ta—Zr—O—Cl—Br | 10 | 0 | 50 | No | 12.50 | 3.3 |
| Example 10 | | 10 | 0 | 50 | Yes | 11.65 | 4.1 |
| Example 11 | Li—Ta—Zr—O—Br | 10 | 0 | 100 | No | 12.52 | 1.4 |
| Example 12 | | 10 | 0 | 100 | Yes | 12.72 | $8.6 \times 10^{-1}$ |
| Example 13 | Li—Ta—Y—O—Cl | 10 | 0 | 0 | No | 12.50 | 2.1 |
| Example 14 | | 10 | 0 | 0 | Yes | 11.57 | 3.3 |
| Example 15 | | 40 | 0 | 0 | No | 12.41 | $1.5 \times 10^{-1}$ |
| Example 16 | | 40 | 0 | 0 | Yes | — | $1.5 \times 10^{-1}$ |

TABLE 2

| | Constituent element | Molar ratio M2/(M1 + M2) [%] | Molar ratio F/X [%] | Molar ratio Br/X [%] | Thermal treatment | Peak within first range [°] | Ionic conductivity [mS/cm] |
|---|---|---|---|---|---|---|---|
| Example 17 | Li—Ta—La—O—Cl | 10 | 0 | 0 | No | 12.3 | 2.3 |
| Example 18 | | 10 | 0 | 0 | Yes | 11.66 | 3.0 |
| Example 19 | | 30 | 0 | 0 | No | — | $3.7 \times 10^{-1}$ |
| Example 20 | Li—Nb—Zr—O—Cl | 10 | 0 | 0 | No | 13.85 | 7.3 |

TABLE 2-continued

| | Constituent element | Molar ratio M2/(M1 + M2) [%] | Molar ratio F/X [%] | Molar ratio Br/X [%] | Thermal treatment | Peak within first range [°] | Ionic conductivity [mS/cm] |
|---|---|---|---|---|---|---|---|
| Example 21 | | 10 | 0 | 0 | Yes | 13.89 | 7.3 |
| Example 22 | | 40 | 0 | 0 | No | 13.53 | $3.7 \times 10^{-1}$ |
| Example 23 | | 40 | 0 | 0 | Yes | — | $3.4 \times 10^{-1}$ |
| Example 24 | Li—Nb—Zr—O—Cl—F | 10 | 25 | 0 | No | 13.25 | $1.5 \times 10^{-1}$ |
| Example 25 | | 10 | 25 | 0 | Yes | 13.12 | $1.9 \times 10^{-1}$ |
| Example 26 | Li—Nb—Zr—O—Cl—Br | 10 | 0 | 25 | No | 13.65 | 3.6 |
| Example 27 | | 10 | 0 | 25 | Yes | 13.6 | 3.5 |
| Example 28 | Li—Nb—Y—O—Cl | 40 | 0 | 0 | No | 14.07 | $3.7 \times 10^{-2}$ |
| Example 29 | | 40 | 0 | 0 | Yes | 13.50 | $2.7 \times 10^{-2}$ |
| Example 30 | Li—Nb—La—O—Cl | 10 | 0 | 0 | No | 13.75 | 3.0 |
| Example 31 | | 10 | 0 | 0 | Yes | 13.76 | 4.2 |
| Comparative Example 1 | Li—O—Cl | 0 | 0 | 0 | No | — | $1.2 \times 10^{-5}$ |
| Comparative Example 2 | Li—Ta—Cl | 0 | 0 | 0 | No | — | $5.6 \times 10^{-4}$ |

(Discussion)

As is clear from Table 1, the solid electrolyte materials according to Examples 1 to 31 have high ionic conductivity of $1 \times 10^{-3}$ mS/cm or more near room temperature. Furthermore, these solid electrolyte materials have high ionic conductivity of $1 \times 10^{-2}$ mS/cm or more.

As is clear from comparing Examples 22 and 23 with Examples 28 and 29, a solid electrolyte material in which M1 is Nb has higher ionic conductivity in the case where M2 is Zr than in the case where M2 is Y. As is clear from comparing Examples 20 and 21 with Examples 30 and 31, a solid electrolyte material in which M1 is Nb has higher ionic conductivity in the case where M2 is Zr than in the case where M2 is La.

As is clear from comparing Example 1 with Examples 13 and 17, a solid electrolyte material in which M1 is Ta has higher ionic conductivity in the case where M2 is Zr than in the case where M2 is Y or La.

As is clear from comparing Examples 9, 10, 26, and 27 with Examples 7, 8, 24, and 25, a solid electrolyte material has higher ionic conductivity in the case where X is Br and Cl than in the case where X is F and Cl.

As is clear from comparing Examples 1 and 2 with Examples 11 and 12, a solid electrolyte material has higher ionic conductivity in the case where X is Cl than in the case where X is Br.

As is clear from comparing Examples 1, 2, 5, and 6 with Examples 7 and 8, a solid electrolyte material having the molar ratio F/X of 0% or more and 5% or less has higher ionic conductivity.

The solid electrolyte materials according to Examples 1 to 31 are free of sulfur, and accordingly generate no hydrogen sulfide.

As described above, the solid electrolyte material according to the present disclosure has practical lithium-ion conductivity, and therefore is suitable for providing a battery having excellent charge and discharge characteristics.

INDUSTRIAL APPLICABILITY

The battery of the present disclosure is utilized, for example, in all-solid-state lithium-ion secondary batteries.

What is claimed is:

1. A solid electrolyte material consisting of:
Li;
M1;
M2;
O; and
X, wherein
M1 is at least one selected from the group consisting of Ta and Nb,
M2 is at least one selected from the group consisting of Zr, Y, and La,
X is at least one selected from the group consisting of Cl and Br,
a molar ratio of a total amount of Li, M1, M2, O, and X to a total amount of all elements constituting the solid electrolyte material is 95% or more, and
a molar ratio of M2 to a total amount of M1 and M2 is more than 0% and 60% or less.

2. The solid electrolyte material according to claim 1, wherein
the solid electrolyte material includes a crystalline phase having a peak within a range of a diffraction angle $2\theta$ from 11.08° to 14.12° in an X-ray diffraction pattern obtained by X-ray diffraction measurement using a Cu-Kα ray.

3. The solid electrolyte material according to claim 1, wherein
the molar ratio of M2 to the total amount of M1 and M2 is 5% or more and 50% or less.

4. The solid electrolyte material according to claim 3, wherein
the molar ratio of M2 to the total amount of M1 and M2 is 10% or more and 50% or less.

5. The solid electrolyte material according to claim 1, wherein
M2 is Zr.

6. A battery comprising:
a positive electrode;
a negative electrode; and
an electrolyte layer disposed between the positive electrode and the negative electrode, wherein
at least one selected from the group consisting of the positive electrode, the negative electrode, and the electrolyte layer includes the solid electrolyte material according to claim 1.

7. A solid electrolyte material consisting of:
Li;
M1;
M2;
O; and

X, wherein the M1 is at least one selected from the group consisting of Ta and Nb, the M2 is at least one selected from the group consisting of Zr, Y, and La, the X is at least one selected from the group consisting of F, Cl, and Br, wherein the solid electrolyte material includes a crystalline phase having a peak within a range of a diffraction angle 2θ from 11.08° to 14.12° in an X-ray diffraction pattern obtained by X-ray diffraction measurement using a Cu-Kα ray.

8. The solid electrolyte material according to claim 7, wherein the X is at least one selected from the group consisting of Cl and Br.

9. The solid electrolyte material according to claim 7, wherein a ratio of an amount of the M2 to a sum of amounts of the M1 and the M2 by mole is more than 0% and 60% or less.

10. The solid electrolyte material according to claim 7, wherein the M2 is Zr.

11. A battery comprising:

a positive electrode;

a negative electrode; and an electrolyte layer disposed between the positive electrode and the negative electrode, wherein at least one selected from the group consisting of the positive electrode, the negative electrode, and the electrolyte layer includes the solid electrolyte material according to claim 7.

\* \* \* \* \*